United States Patent
Hanson et al.

(10) Patent No.: US 12,039,479 B1
(45) Date of Patent: Jul. 16, 2024

(54) BUSINESS PROCESS MANAGEMENT INFORMATION DISPLAY

(71) Applicant: Wells Fargo Bank, N.A., San Francisco, CA (US)

(72) Inventors: Timothy Gerard Hanson, Des Moines, IA (US); Joseph Daniel Rodgers, Waukee, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 86 days.

(21) Appl. No.: 17/173,901

(22) Filed: Feb. 11, 2021

Related U.S. Application Data (60) Division of application No. 14/949,299, filed on Nov. 23, 2015, now Pat. No. 10,956,848, which is a continuation of application No. 14/944,964, filed on Nov. 18, 2015, now abandoned.

(51) Int. Cl.
  *G06Q 10/06* (2023.01)
  *G06F 3/0481* (2022.01)
  *G06Q 10/0637* (2023.01)

(52) U.S. Cl.
  CPC ....... *G06Q 10/0637* (2013.01); *G06F 3/0481* (2013.01)

(58) Field of Classification Search
  CPC .................................................. G06Q 10/06
  See application file for complete search history.

(56) References Cited

U.S. PATENT DOCUMENTS

| | | | |
|---|---|---|---|
| 5,233,513 A | 8/1993 | Doyle | |
| 7,957,992 B2* | 6/2011 | Gilbert | G06Q 10/06316 705/7.38 |
| 8,606,622 B2 | 12/2013 | Chang et al. | |
| 2001/0047326 A1 | 11/2001 | Broadbent et al. | |
| 2008/0177782 A1* | 7/2008 | Poston | G06F 40/197 707/999.102 |
| 2009/0024432 A1 | 1/2009 | Bauters et al. | |
| 2010/0114631 A1 | 5/2010 | Beaton et al. | |
| 2010/0205616 A1 | 8/2010 | Lai et al. | |
| 2011/0099558 A1* | 4/2011 | Patrick | H04L 63/18 719/315 |

(Continued)

FOREIGN PATENT DOCUMENTS

WO  WO-2013177178 A2 * 11/2013 ............. G06Q 10/06

OTHER PUBLICATIONS

Mika Koskela & Jyrki Haajanen, Business Process Modeling and Execution, Tools and technologies report for SOAMeS project, VTT 2007. (Year: 2007).*

(Continued)

*Primary Examiner* — Kurtis Gills
(74) *Attorney, Agent, or Firm* — Merchant & Gould P.C.

(57) ABSTRACT

A Business Process Management (BPM) information display system and method includes identifying a BPM asset that has been modified, comparing the modified BPM asset to a second version of the BPM asset, and identifying an activity within the modified BPM asset that has been modified. A user interface is generated by a computing system in which the modified BPM asset and the second version of the BPM asset are displayed, including highlighting the modified activity on the user interface.

8 Claims, 7 Drawing Sheets

(56) References Cited

U.S. PATENT DOCUMENTS

| | | | |
|---|---|---|---|
| 2011/0184782 A1* | 7/2011 | Delany | G06Q 10/06 |
| | | | 705/7.37 |
| 2012/0239444 A1* | 9/2012 | Williams | G06Q 10/067 |
| | | | 705/7.11 |
| 2013/0152041 A1* | 6/2013 | Hatfield | G06Q 10/06 |
| | | | 717/105 |
| 2014/0172500 A1* | 6/2014 | Schimmelpfennig | G06F 8/10 |
| | | | 705/7.29 |
| 2014/0201131 A1* | 7/2014 | Burman | G06F 16/38 |
| | | | 707/608 |
| 2014/0244539 A1 | 8/2014 | Harmon et al. | |
| 2014/0282193 A1* | 9/2014 | Bann | G05B 19/409 |
| | | | 715/771 |
| 2014/0310243 A1 | 10/2014 | McGee et al. | |
| 2015/0161192 A1* | 6/2015 | Scoles | G06F 16/2322 |
| | | | 707/725 |
| 2015/0199411 A1* | 7/2015 | Greenspan | G06F 40/197 |
| | | | 715/764 |

OTHER PUBLICATIONS

Google Scholar Search, "Keyword Search", Publication date anytime Nov. 18, 2015.

* cited by examiner

BUSINESS PROCESS MANAGEMENT INFORMATION DISPLAY

CROSS REFERENCE TO RELATED APPLICATIONS

This application is a continuation of application Ser. No. 14/949,299 filed Nov. 23, 2015 which is a continuation of application Ser. No. 14/944,964 filed Nov. 18, 2015, which are incorporated herein by reference in their entirety.

BACKGROUND

Business Process Management (BPM) is an approach to identify, design, execute, document, measure, monitor, and control both automated and non-automated business processes. Various computer-based BPM applications are available to facilitate BPM for an organization. BPM applications may be implemented through software application suites operating on local computer networks, or through cloud computing solutions, for example.

BPM applications provide software components that allow users to understand and better manage their processes. Graphical user interfaces illustrating business processes in a flow chart-like manner provide concise views of the processes and allow for easier manipulation of the various aspects of the business processes.

SUMMARY

In accordance with certain aspects of the present disclosure, an information display systems and methods include accessing Business Process Management (BPM) assets to identify a BPM asset that has been modified. The modified BPM asset is compared to another version of the BPM asset, and an activity within the modified BPM asset that has been modified is identified. The modified BPM asset and the second version of the BPM asset are displayed on a user interface, and the modified activity is highlighted on the user interface. Thereafter, further information and details regarding the modified assets and/or activities may then be displayed on the user interface, reports regarding the modified assets and/or activities may be generated, etc.

DETAILED DESCRIPTION

In the following Detailed Description, reference is made to the accompanying drawings, which form a part hereof, and in which is shown by way of illustration specific embodiments in which the invention may be practiced. The following detailed description, therefore, is not to be taken in a limiting sense.

Business processes are often very complex and can be difficult to manage. Loan processes, such as for mortgage loans and commercial loans, for example, often require compliance with rules and requirements of government agencies, underwriters, insurers, etc. Thus, manual approaches to managing loans can be difficult. There are risks associated with manual processes, such as manual data entry, lost documentation, rule compliance, and the like. Manual approaches further can make responding to customer needs, and may consume considerable human resources.

Accordingly, Business Process Management (BPM) tools are often employed for financial processes such as various loan products, in which particular processes are defined and modeled. In the context of a loan, such as a mortgage loan, the various steps in the process beginning, for example, with receiving a potential borrower's application through final approval and funding the loan may be monitored using automated BPM tools.

A typical BPM system generates a graphic view, such as a flowchart, of the processes to be managed. Thus, each step, or asset, in the process is defined, as well as the activities for each asset. As used herein, asset refers to a file in a BPM library, such as a business process diagram (BPD), an event message, a team of users, business object, etc., and activity refers to a shape within a BPD diagram, such as a human task, a system task, a decision point, etc. Known BPM tools may not provide a mechanism for comparing two process applications comprehensively. Typically, all that is provided is a simple listing of some of the files that have been modified.

Figure 1:
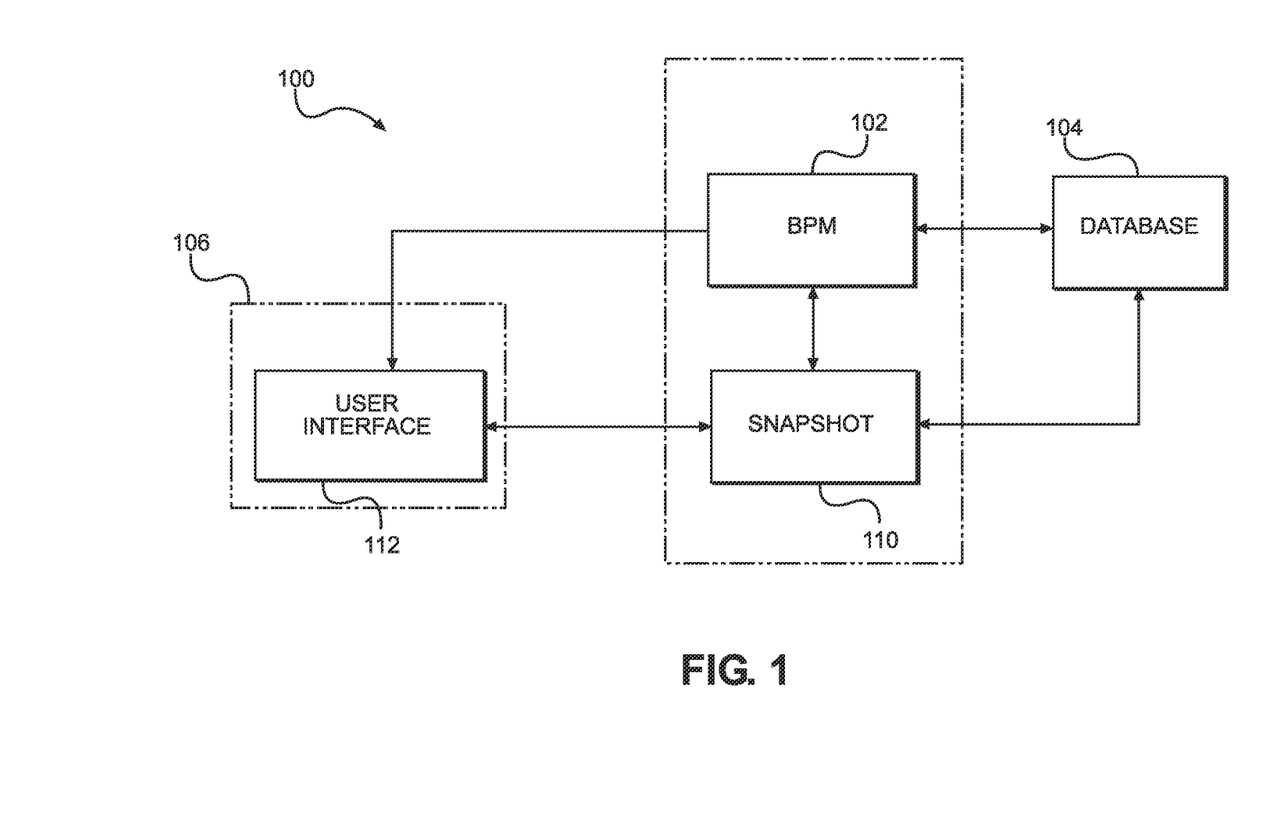
FIG. 1 is a block diagram illustrating an example of a Business Process Management (BPM) information display system in accordance with aspects of the present disclosure.

FIG. 1 illustrates aspects of an example BPM "snapshot" comparison system 100. Examples of the system 100 generate a user interface that displays the information and visualization needed to properly assess and analyze the process changes in a BPM system. The illustrated system 100 includes a BPM engine 102, which is configured to allow users to define and manage business processes. BPM assets are stored in one or more databases 104, which may be local to the BPM engine 102, and/or cloud-based, accessible over a network such as the internet. A snapshot engine 110 interfaces with the BPM engine 102 and the database 104 to compare processes and generate one or more user interfaces 112. The BPM engine 102 and the snapshot engine 110 could be implemented on a common computing system, or separate computers that are accessible to one another, for example, over a network. The user interface 112 may be displayed on a user device 106 such as a desktop computer, laptop computer, tablet personal computer, smart phone, etc. that communicates with the computer system(s) implementing the BPM engine 102 and/or snapshot engine 110 over a network such as the internet. Alternatively, the user interface 112 could be displayed on a component of the computing system(s) implementing the BPM engine 102 and/or snapshot engine 110.

Figure 2A:
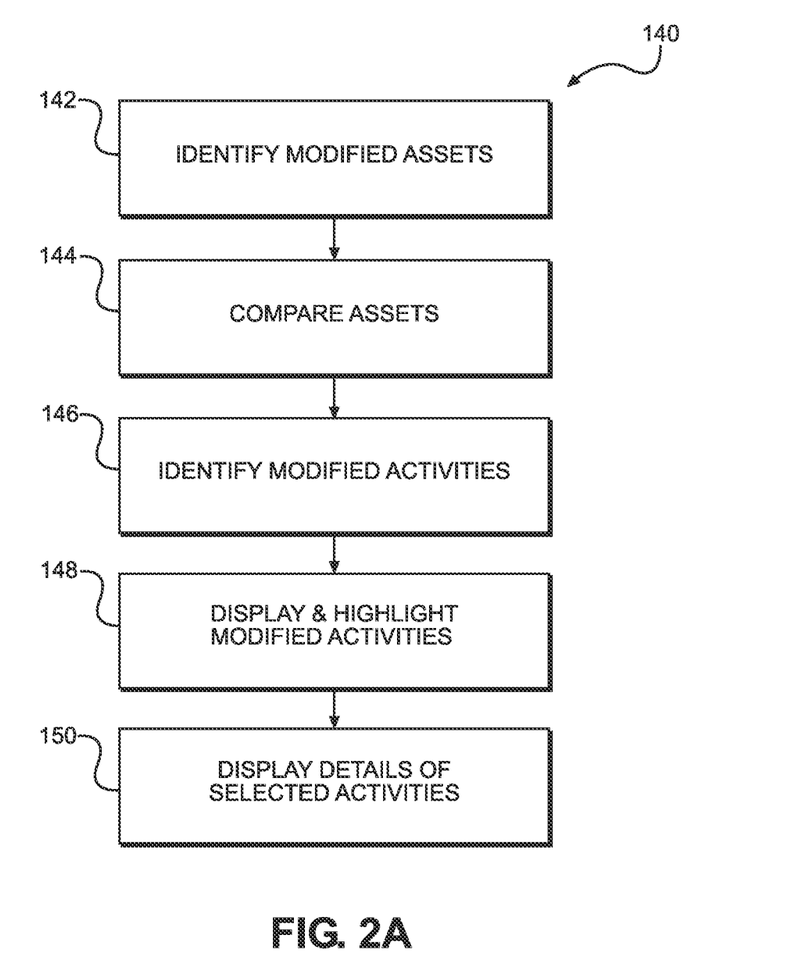
FIG. 2A is a flow diagram illustrating an example of a BPM information display process implemented by the system of FIG. 1.

The snapshot engine 110 interfaces with the BPM engine 102 and database 104 to identify changes in a BPM process, and then generate the user interface 112 to display the process changes for a user. FIG. 2A illustrates aspects of an example of a snapshot display process 140 implemented by the system 100 shown in FIG. 1. In block 142, the snapshot engine 110 interfaces with the BPM engine 102 and/or database 104 to analyze BPM assets and identify assets that have been modified. In some embodiments, the identified modified assets are displayed so a user can select a desired modified asset for further analysis. In block 144, the identified modified assets are compared to another version, such as an earlier version of the asset. The user may select the desired versions of the asset for comparison, for example, by selecting from a list of available versions of the asset displayed on the user interface 112. In some examples, once the modified assets have been identified a Java service is used to load the data for each asset and a comparison is performed. The data is loaded using the data access object (DAO) pattern to return a data transfer object (DTO) representation of the modified asset. Using Java reflection the two versions of the asset are compared against each other to identify modified assets in block 146.

Continuing the comparison example, each change to the asset is marked by its type. Types of changes include:
- Added—An activity within the asset was added to the later snapshot
- Deleted—An activity within the asset was deleted
- Modification—A property within the asset was changed
- Moved—A visual change was made to the asset with no impacting logical change
- Conflicted—The same change was made in both snapshots but the IDs are different between the two snapshots.

Groupings such as these allow for quick identification of possible instance migration issues from any deleted or conflicted change.

Once a modified asset is chosen by a user, the snapshot engine 110 generates a display on the user interface 112, in which the chosen asset is shown with modified activities highlighted as stated in block 148. In some implementations, the user interface 112 displays both the selected modified asset as well as the earlier version, with the modified activities highlighted in one or both views. For example, the snapshots of the compared assets may be displayed simultaneously in respective windows in the user interface 112. The modified asset is displayed in one window or panel, and an additional panel is generated in which the earlier version of the asset is displayed.

Figure 2B:
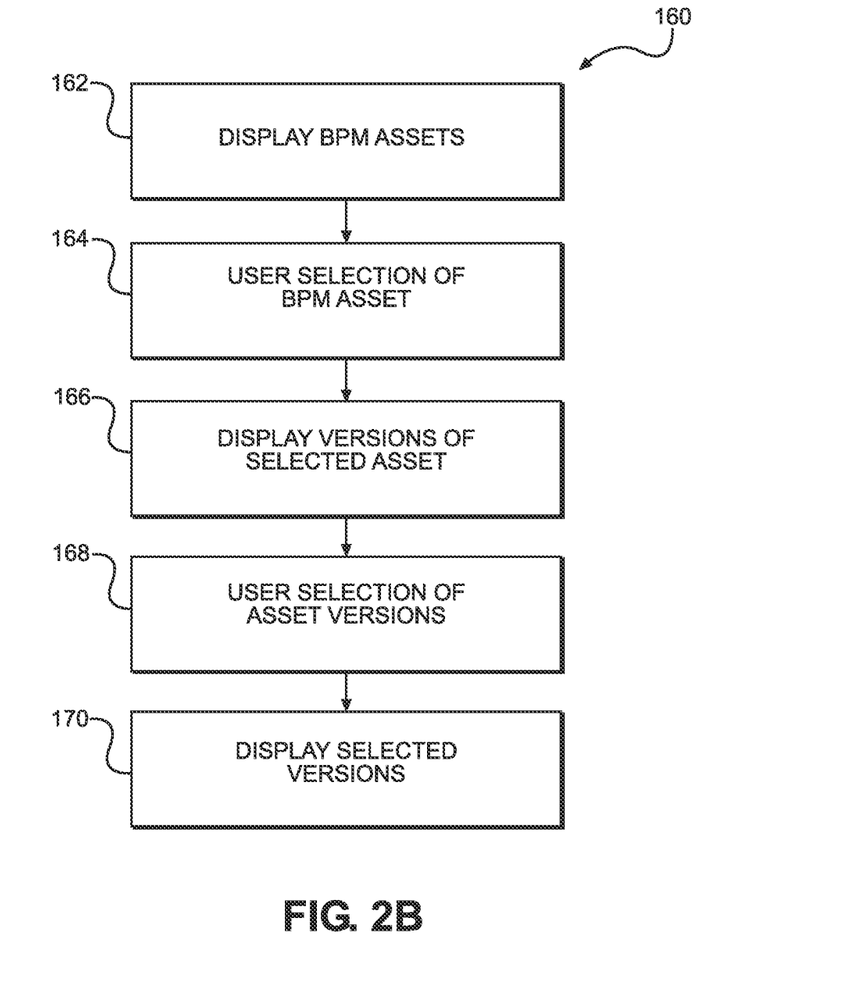
FIG. 2B is a flow diagram illustrating another example of a BPM information display process implemented by the system of FIG. 1.

In the example process 160 shown in FIG. 2B, a list of BPM assets having modifications made thereto is generated by the snapshot engine 110 and displayed on the user interface 112 in block 162. In block 164, a user selects a desired BPM asset for analysis from the list via the user interface. In response to the user's selection in block 164, a list of versions, or snapshots, of the selected BPM asset is displayed on the user interface 112 in block 166. The user then may select first and second versions, or snapshots, of the BPM asset for display on the user interface in block 168. In response to the user's selection in block 168, the first and second versions are displayed simultaneously on the user interface 112 in block 170, including highlighting any modified activities. As noted above, the first and second versions of the modified asset are simultaneously displayed in respective windows on the user interface 112 in some embodiments. Other embodiments are envisioned in which more than two versions of the modified assets may be simultaneously displayed.

In the system and process illustrated in FIGS. 1 and 2, the user interface for displaying the compared snapshots is generated by the snapshot engine 110 rather than the BPM engine 102 itself. As noted above, the BPM engine generates its own user interface for creating and managing the business process. Part of the operation of the BPM engine 102 includes generating BPM diagrams similar to flow charts.

For purposes of displaying and comparing modified assets and highlighting modified activities, the BPM diagrams are replicated by the snapshot engine 110 and displayed on the user interface 112 with the modified activities highlighted.

In certain examples in which the BPM engine 102 is implemented via the IBM Business Process Manager (BPM) application, a combination of the IBM BPM-provided REST API and a Java method are called to retrieve the details of modified activities for the selected asset. An AngularJS diagram viewer shows the diagram and its activities in their correct X/Y positions and any changed activities are highlighted with the same change types described above. Scalable vector graphics (SVG) are used to place sequence flows in their correct positions.

The user can select an activity and properties of that activity are shown in the user interface 112 for both snapshot versions (modified asset and earlier version of the asset) shown. The scrolling may also kept in sync in both display windows, which helps to correctly identify the changes made.

If there were several modifications to certain activities between the two compared assets, the user interface is configured to allow the user to step through those changes separately via a "revision history" panel. In this manner, the user may view each of the changes to the selected activity.

In some instances, the two snapshots selected for comparison could be on different tracks or software branches. In order to identify the modified assets, the revision path through the different tracks needs to be identified. To accomplish this, in some embodiments the revision path from the root track of the process application to each of the selected snapshots is calculated. Then the shared part of each path is ignored and only the modifications on each unique path are considered.

Upon selection of a displayed modified activity, the user interface may further display details of the changes to the selected activity, such as the type of modification, the date and time of the modification, the identity of the person making the modification, etc.

Figure 3:
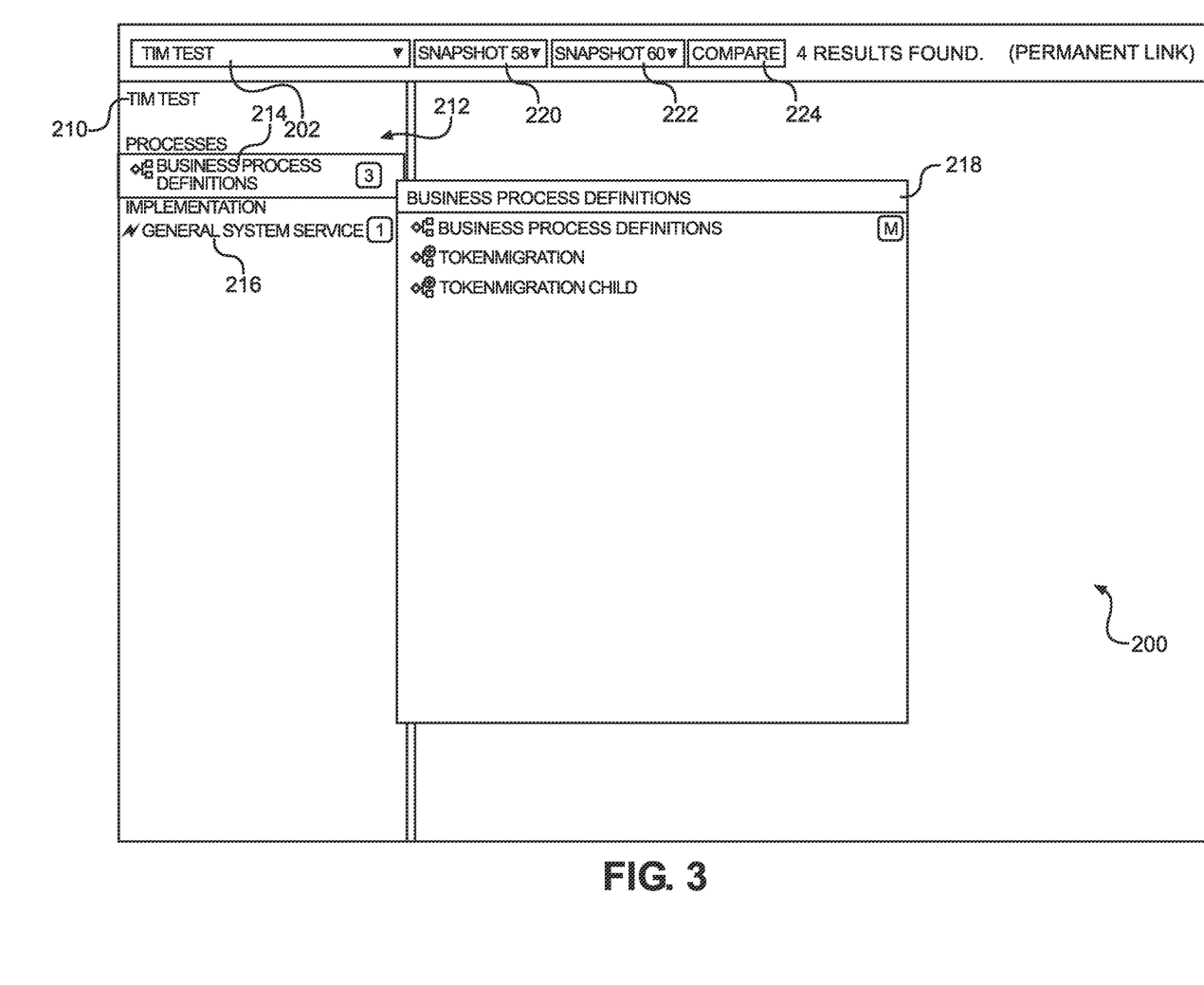
FIG. 3 is an example user interface display showing modified BPM assets.

FIG. 3 is a portion of a display screen 200 of the user interface 112 generated by the snapshot engine 110. In the example depicted in FIG. 3, a user has selected a desired process 210 via a dropdown box 202, and modified assets 212 within the selected process are displayed in the left panel of the display 200. In the illustrated example, two process assets 214, 216 have been identified as including modifications. Selecting one of the modified assets 214 displays a list 218 of the identified modifications. First and second dropdown boxes allow the user to select two versions 220, 222 of the identified modified assets for viewing. The user may then activate a compare button 224 to display the two versions of the modified activities on another display of the user interface 112.

Figure 4:
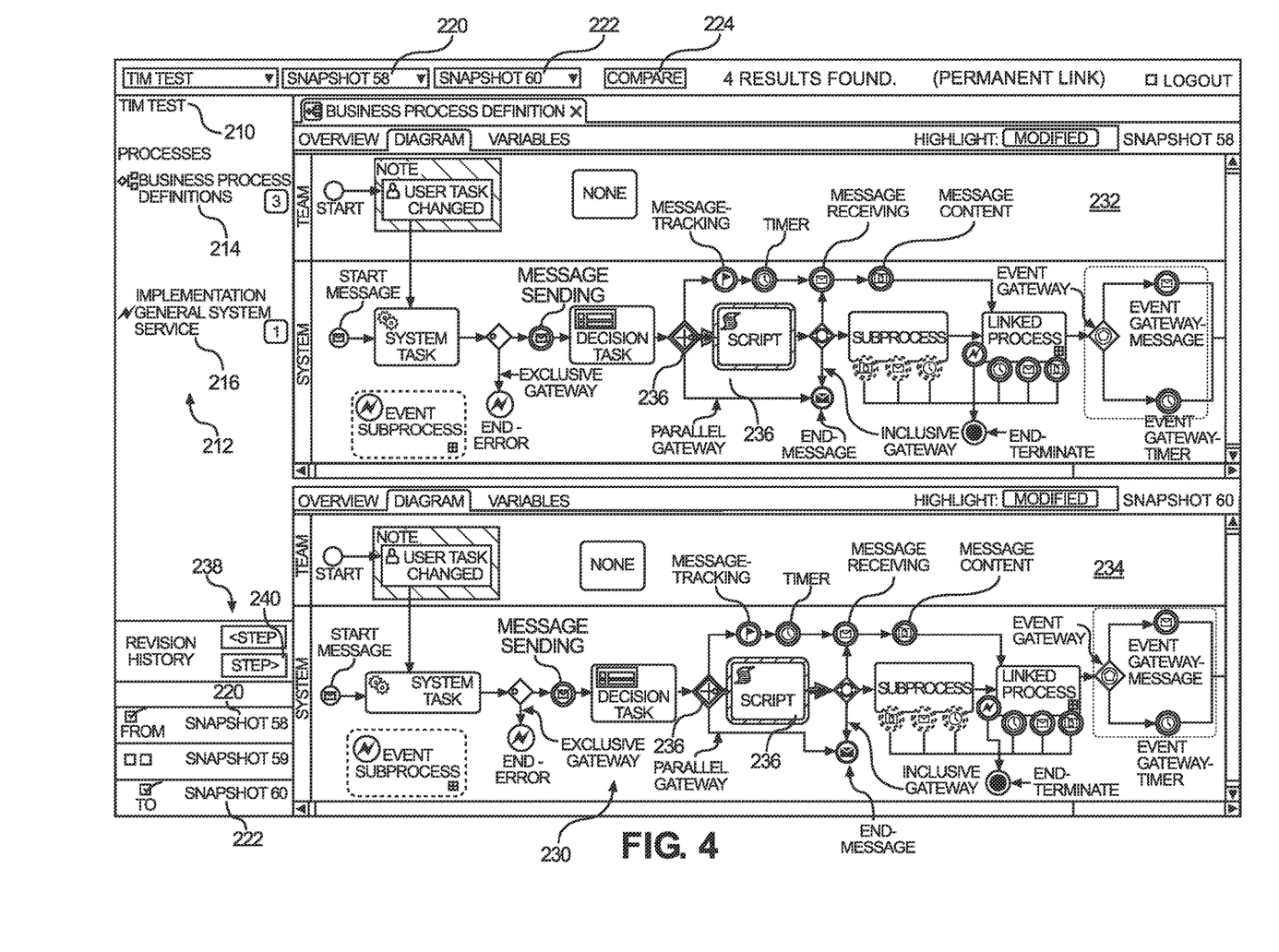
FIG. 4 is another example user interface display highlighting modified activities of a modified selected BPM asset.

FIG. 4 shows another display screen 230, where the selected versions 220, 222 of the selected modified asset 214 are displayed. In the illustrated example, the activities within each of the selected assets 220, 222 are shown in respective panels, or windows, 232, 234. Modified activities 236 are highlighted in each of the respective panels 232, 234. A revision history section 238 is shown in the lower left portion of the display 230, in which the identified modified versions of the selected asset 214 are displayed. The user may select the desired "from" and "to" checkboxes for the desired versions 220, 224. If certain of the modified activities 236 have been modified multiple times between the selected versions, the user may activate a "step" button 240, in response to which the modifications are displayed sequentially.

Figure 5:
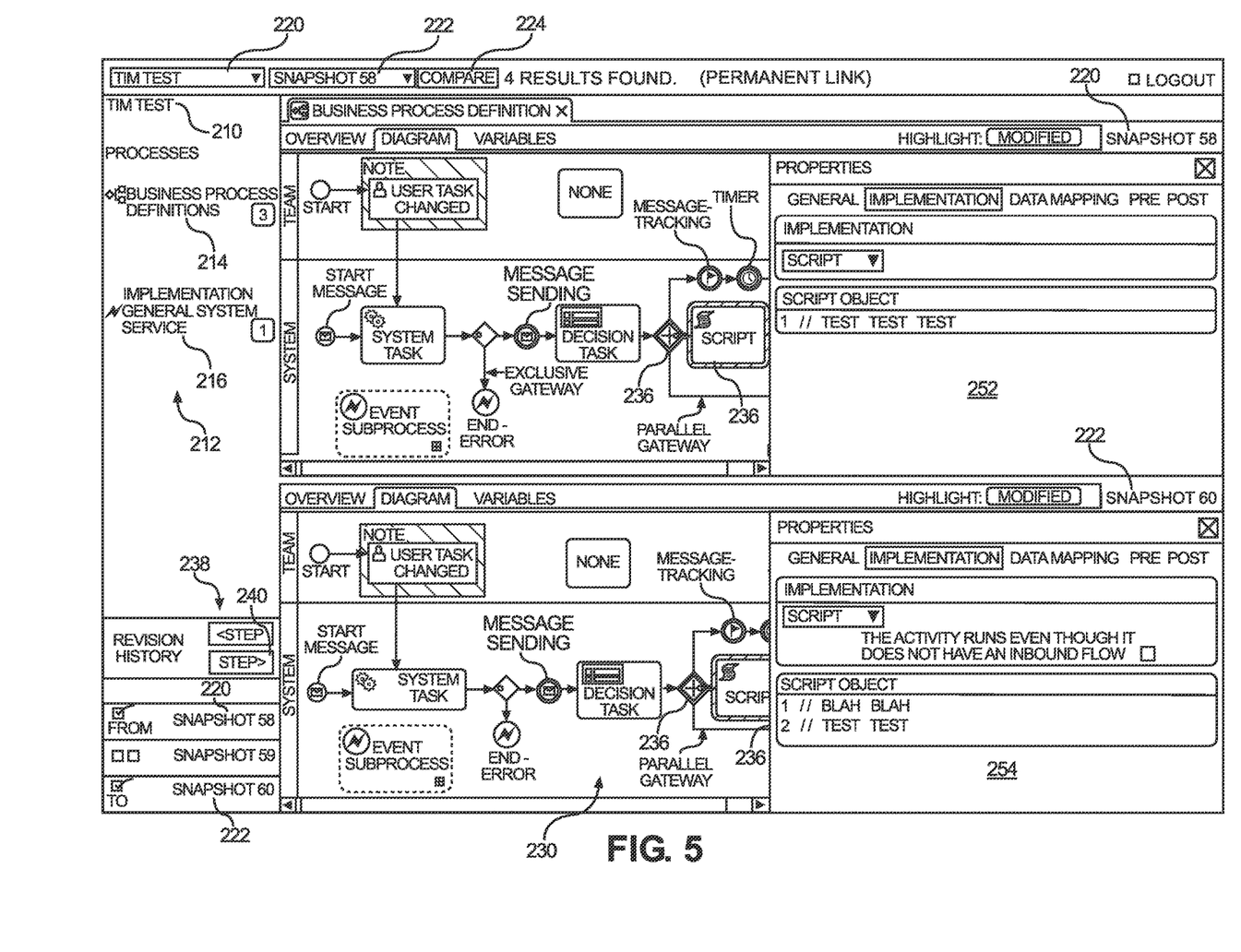
FIG. 5 is another example user interface display showing specific changes of a selected modified activity.

FIG. 5 shows a further display screen 250 in which one of the highlighted, modified activities 236a is selected by the user through the user interface 112. In response to selection of the modified activity 236a, respective information displays 252, 254 are displayed, showing details of the modifications made to the selected activities 236a. Details such as the modification type, time/date, operator, etc. may be displayed.

Figure 6:
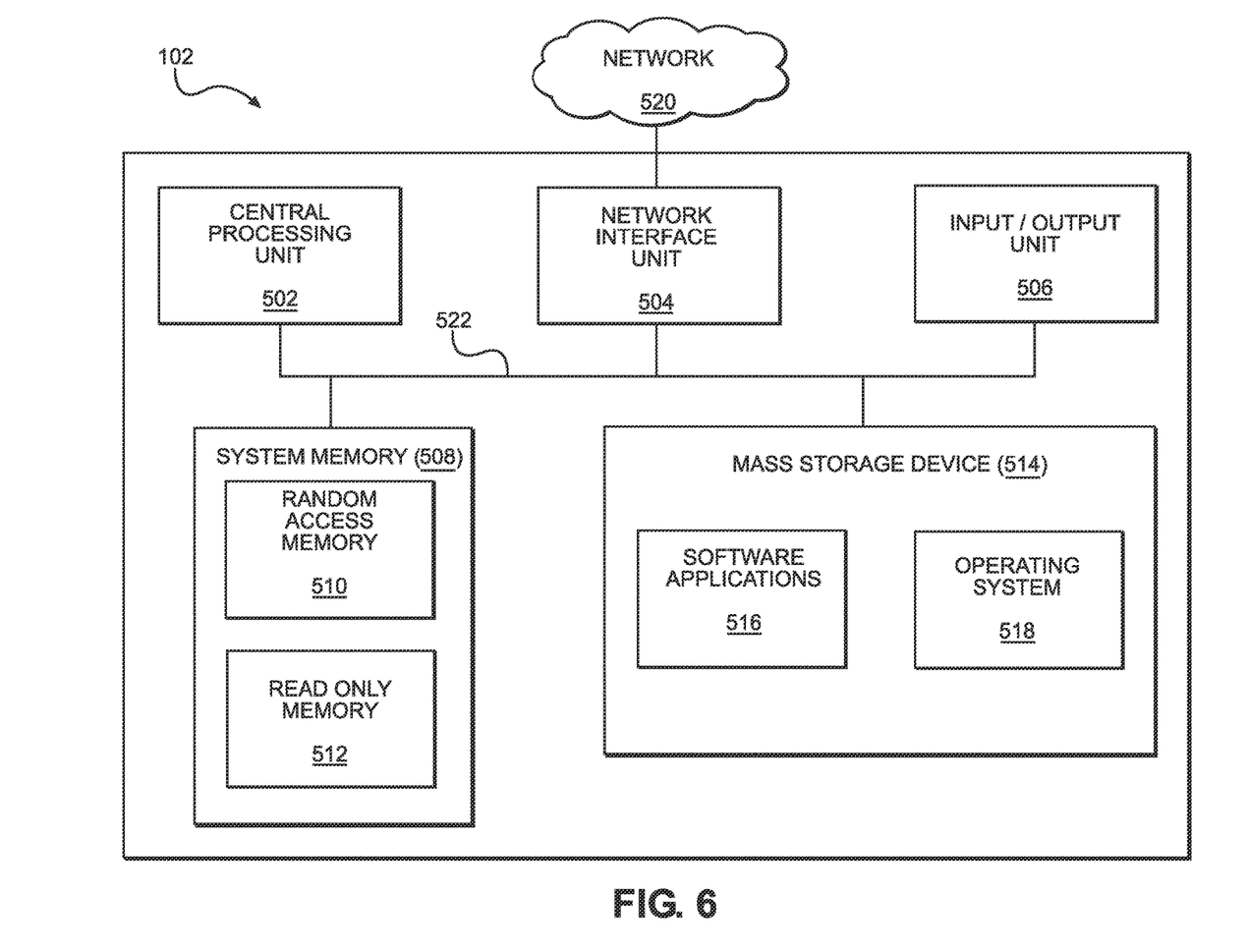
FIG. 6 is a block diagram illustrating portions of an example computer system.

FIG. 6 schematically illustrates an example a computer system suitable for implementing aspects of the system 100 illustrated in FIG. 1. The BPM engine 102, snapshot engine 110, user device 106 and database 104 could all be implemented on a common computer system, or the various components could be implemented on one or more separate computer systems that are accessible by one another. The computer 500, which may be a server computer, for example, includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the server computer 500, such as during startup, is stored in the ROM 512. The computer 500 further includes a mass storage device 514. The mass storage device 514 is able to store software instructions and data. One or more of the databases 104 could be implemented by the mass storage device 512, or one or more of the databases could be implemented by other computer systems accessible by the computer 500.

The mass storage device 514 is connected to the CPU 502 through a mass storage controller (not shown) connected to the system bus 522. The mass storage device 514 and its associated computer-readable data storage media provide non-volatile, non-transitory storage for the server computer 500. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 500.

According to various embodiments of the invention, the server computer 500 may operate in a networked environment using logical connections to remote network devices through the network 520, such as a wireless network, the Internet, or another type of network. The server computer 500 may connect to the network 520 through a network interface unit 504 connected to the system bus 522. It should be appreciated that the network interface unit 504 may also be utilized to connect to other types of networks and remote computing systems. The server computer 500 also includes an input/output controller 506 for receiving and processing input from a number of other devices, including the user interface 112 generated on the user device 106, which could include a touch user interface display screen, or another type of input device. Similarly, the input/output controller 506 may provide output to a touch user interface display screen or other type of output device.

As mentioned briefly above, the mass storage device 514 and the RAM 510 of the server computer 500 can store software instructions and data. The software instructions include an operating system 518 suitable for controlling the operation of the server computer 500. The mass storage device 514 and/or the RAM 510 also store software instructions, that when executed by the CPU 502, cause the server computer 500 to provide the functionality of the server computer 500 discussed in this document. For example, the mass storage device 514 and/or the RAM 510 can store software instructions that, when executed by the CPU 502, cause the server computer 500 to implement the snapshot engine 110 shown in FIG. 1.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a computing system that includes a processor programmed to perform the steps of the method, the method comprising:

displaying, by the processor on a user interface, a list of business process management assets;

receiving, by the processor, a user selection of a selected business process management asset from the listed business process management assets via the user interface, wherein the selected business process management asset is associated with managing a loan application process;

displaying, by the processor on the user interface, a list of versions of the selected business process management asset;

receiving user selections of a first version and a second version of the selected business process management asset from the list of versions;

displaying a graphic view of the first version of the selected business process management asset on a first panel within the user interface and the second version of the selected business process management asset simultaneously on a second panel within the user interface, including highlighting, with a visual indicia an activity of at least one of the first version and the second version of the selected business process management asset that has been modified, wherein the activity is associated with the loan application process; and upon receiving, by the processor, a selection of a step option via the user interface, the processor:

displaying each of a plurality of modifications made to the activity between the first version and the second version of the business process management asset in a sequential order on the user interface; and stepping through each modification of the plurality of modifications made to the activity between the first version and the second version of the business process management asset in the sequential order.

2. The method of claim 1, further comprising displaying a revision history of the first and second versions of the business process management asset on the user display.

3. The method of claim 1, further comprising identifying business process management assets that have been modified, wherein the displayed list of business process management assets includes the identified modified business process management assets.

4. The method of claim 1, further comprising displaying details of the activity that has been modified on the user interface in response to a user selection of the highlighting of the activity that has been modified.

5. The method of claim 1, further comprising:
   accessing a database storing a plurality of business process management assets; and
   analyzing the business process management assets to identify modified ones of the business process management assets;
   wherein the displayed list of business process management assets is a list of the modified business process management assets.

6. The method of claim 1, further comprising:
   determining whether the modified activity has been modified multiple times between the first and second versions of the selected business process management asset.

7. A computer-readable data storage medium storing instructions that, when executed by a computing system with a processor, implement a method comprising:
   accessing, via the processor, a database storing a plurality of business process management assets, wherein the plurality of business process management assets is associated with managing a loan application process;
   analyzing, using the processor, the plurality of business process management assets to identify modified business process management assets;
   displaying, by the processor on a user interface, a list of versions of the modified business process management assets;
   receiving user selections of a first version and a second version of the modified business process management asset from the list of versions;
   displaying, a graphic view of the first version of a selected one of the modified business process management asset on a first panel within the user interface and the second version of the selected one of the modified business process management assets simultaneously on a second panel within the user interface;
   highlighting, with a visual indicia, on the display on the user device, a modified activity of at least one of the first version and the second version of the selected one of the modified business process management assets, wherein the modified activity is associated with the loan application process; and
   upon receiving, by the processor, a selection of a step option via the user interface, the processor:
      displaying each of a plurality of modifications made to the modified activity between the first version and the second version of the business process management asset in a sequential order on the user interface; and
      stepping through each modification of the plurality of modifications made to the activity between the first version and the second version of the business process management asset in the sequential order.

8. The computer-readable data storage medium of claim 7, wherein analyzing the plurality of business process management assets includes comparing the business process management assets to earlier versions of the business process management assets.

\* \* \* \* \*

UNITED STATES PATENT AND TRADEMARK OFFICE
CERTIFICATE OF CORRECTION

PATENT NO. : 12,039,479 B1
APPLICATION NO. : 17/173901
DATED : July 16, 2024
INVENTOR(S) : Hanson et al.

It is certified that error appears in the above-identified patent and that said Letters Patent is hereby corrected as shown below:

In the Claims

Column 6, Line 54, Claim 1: delete "indicia" and insert --indicia,--

Signed and Sealed this
Tenth Day of September, 2024

Katherine Kelly Vidal
*Director of the United States Patent and Trademark Office*